US010927261B2

(12) United States Patent
Choi et al.

(10) Patent No.: US 10,927,261 B2
(45) Date of Patent: Feb. 23, 2021

(54) CARBON BLACK AND RUBBER COMPOUNDS INCORPORATING SAME

(71) Applicant: Cabot Corporation, Boston, MA (US)

(72) Inventors: Jaesun Choi, Daejeon (KR); Theis F. Clarke, Houston, TX (US); Dhaval A. Doshi, Lexington, MA (US)

(73) Assignee: Cabot Corporation, Boston, MA (US)

( * ) Notice: Subject to any disclaimer, the term of this patent is extended or adjusted under 35 U.S.C. 154(b) by 150 days.

(21) Appl. No.: 15/964,480

(22) Filed: Apr. 27, 2018

(65) Prior Publication Data
US 2018/0319992 A1 Nov. 8, 2018

Related U.S. Application Data

(60) Provisional application No. 62/500,672, filed on May 3, 2017.

(51) Int. Cl.
| | | |
|---|---|---|
| C09C 1/56 | (2006.01) | |
| C08K 3/04 | (2006.01) | |
| C08K 9/04 | (2006.01) | |
| C09C 1/52 | (2006.01) | |
| C09C 1/50 | (2006.01) | |

(52) U.S. Cl.
CPC .............. *C09C 1/56* (2013.01); *C08K 9/04* (2013.01); *C09C 1/50* (2013.01); *C09C 1/52* (2013.01); *C01P 2002/60* (2013.01); *C01P 2004/51* (2013.01); *C01P 2004/64* (2013.01); *C01P 2006/12* (2013.01); *C01P 2006/19* (2013.01); *C08K 3/04* (2013.01); *C08K 2201/002* (2013.01); *C08K 2201/005* (2013.01); *C08K 2201/006* (2013.01); *C08K 2201/011* (2013.01)

(58) Field of Classification Search
CPC ..................................... C09C 1/48; C09C 1/56
See application file for complete search history.

(56) References Cited

U.S. PATENT DOCUMENTS

| 5,554,739 A | 9/1996 | Belmont |
|---|---|---|
| 5,571,311 A | 11/1996 | Belmont et al. |
| 5,630,868 A | 5/1997 | Belmont et al. |
| 5,672,198 A | 9/1997 | Belmont |
| 5,689,016 A | 11/1997 | Weider et al. |
| 5,707,432 A | 1/1998 | Adams et al. |
| 5,713,988 A | 2/1998 | Belmont et al. |
| 5,803,959 A | 9/1998 | Johnson et al. |
| 5,837,045 A | 11/1998 | Johnson et al. |
| 5,851,280 A | 12/1998 | Belmont et al. |
| 5,916,956 A | 6/1999 | Wang et al. |
| 5,922,118 A | 7/1999 | Johnson et al. |
| 6,048,923 A | 4/2000 | Mabry et al. |
| 6,057,387 A | 5/2000 | Mahmud et al. |
| 6,069,190 A | 5/2000 | Bates et al. |
| 6,197,274 B1 | 3/2001 | Mahmud et al. |
| 6,485,693 B1 | 11/2002 | Morgan |
| 6,541,113 B1 | 4/2003 | Mehos et al. |
| 7,214,263 B2 | 5/2007 | Kakiuchi et al. |
| 7,232,480 B2 | 6/2007 | Momose et al. |
| 7,582,688 B2 | 9/2009 | Mabry et al. |
| 7,687,566 B2 | 3/2010 | Matsuki et al. |
| 7,829,057 B2 | 11/2010 | Kutsovsky et al. |
| 8,242,199 B2 | 8/2012 | Yanagioka |
| 8,536,249 B2 | 9/2013 | Zhang et al. |
| 8,586,651 B2 | 11/2013 | Wang et al. |
| 8,975,316 B2 | 3/2015 | Belmont et al. |
| 9,109,098 B2 | 8/2015 | Yanagioka |
| 9,175,150 B2 | 11/2015 | Rumpf et al. |
| 9,287,565 B2 | 3/2016 | Atanassova et al. |
| 9,388,300 B2 | 7/2016 | Dikan et al. |
| 2006/0186383 A1 | 8/2006 | Matsuki et al. |
| 2010/0009280 A1 | 1/2010 | Liu et al. |
| 2011/0124792 A1 | 5/2011 | Froehlich et al. |
| 2011/0244382 A1 | 10/2011 | Christopher et al. |
| 2013/0130113 A1 | 5/2013 | Takano et al. |
| 2016/0024270 A1* | 1/2016 | Schwaiger ............ B82Y 30/00 523/155 |

FOREIGN PATENT DOCUMENTS

| EP | 2 998 351 A1 | 3/2016 | |
|---|---|---|---|
| WO | WO-2017005921 A1 * | 1/2017 | ............. C08L 23/06 |

* cited by examiner

*Primary Examiner* — Wenwen Cai

(57) ABSTRACT

Carbon blacks such as reinforcing-grade carbon blacks with high structure are described. The carbon black can have the following properties: a statistical thickness surface area (STSA) ranging from 80 $m^2/g$ to 150 $m^2/g$, an oil absorption number (OAN) of at least 180 mL/100 g, and a crushed oil absorption number (COAN) of at least 110 mL/100 g. Rubber compounds which incorporate the carbon black also are described.

37 Claims, 2 Drawing Sheets

CARBON BLACK AND RUBBER COMPOUNDS INCORPORATING SAME

BACKGROUND OF THE INVENTION

The present invention relates to carbon black and rubber compounds which incorporate the carbon black.

Carbon black has been used to modify the mechanical, electrical, and optical properties in compositions. Carbon blacks and other fillers have been utilized as pigments, fillers, and/or reinforcing agents in the compounding and preparation of compositions used in rubber, plastic, paper or textile applications. The properties of the carbon black or other fillers are important factors in determining various performance characteristics of these compositions. Important uses of elastomeric compositions relate to the manufacture of tires and additional ingredients often are added to impart specific properties to the finished product or its components. Carbon blacks have been used to modify functional properties, electrical conductivity, rheology, surface properties, viscosity, appearances and other properties in elastomeric compositions and other types of compositions.

As indicated above, carbon blacks and other fillers can provide reinforcing benefits to a variety of materials, including elastomeric compositions. Besides the conventional filler attributes, there is a desire to provide fillers which can improve one or more elastomeric properties, such as hysteresis, abrasion resistance, or stiffness. However, in the past, with some elastomeric compositions using carbon blacks or other fillers, a filler can typically improve one property, but to the detriment of another property. Thus, there is a continual need to provide fillers for elastomeric compositions which preferably can enhance an elastomeric property without incurring detriment to another property.

SUMMARY OF THE PRESENT INVENTION

A feature of the present invention is to provide a novel class of carbon blacks having a unique combination(s) of carbon black properties.

An additional feature of the present invention is to provide carbon blacks that promote one or more beneficial properties in rubber or other elastomeric compositions when present without incurring any significant detriment to another property thereof.

A further feature of the present invention is to provide a carbon black which can impart a beneficial balance of properties in rubber compositions when present.

An additional feature of the present invention is to provide a carbon black with high structure which can have the ability to improve hysteresis while maintaining stiffness in rubber compositions when present.

A further feature of the present invention is to provide a carbon black with high structure which can be used in energy storage devices and other electrical or electrochemical components and devices, such as electrodes (e.g., positive electrodes of lithium-ion batteries), and capacitors (e.g., electrochemical capacitors).

An additional feature of the present invention is to provide a rubber compound which is modified with the indicated carbon black.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages and in accordance with the purposes of the present invention, as embodied and broadly described herein, the present invention relates to a carbon black having the properties of a statistical thickness surface area (STSA) ranging from 80 to 150 $m^2/g$, an oil absorption number (OAN) of at least 180 mL/100 g, and a crushed oil absorption number (COAN) of at least 110 mL/100 g.

The present invention further relates to a rubber compound which comprises at least one polymer and the indicated carbon black. The rubber compound can be a vulcanized rubber composition, a vulcanizable rubber composition, or an uncured rubber composition.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

Figure 1:
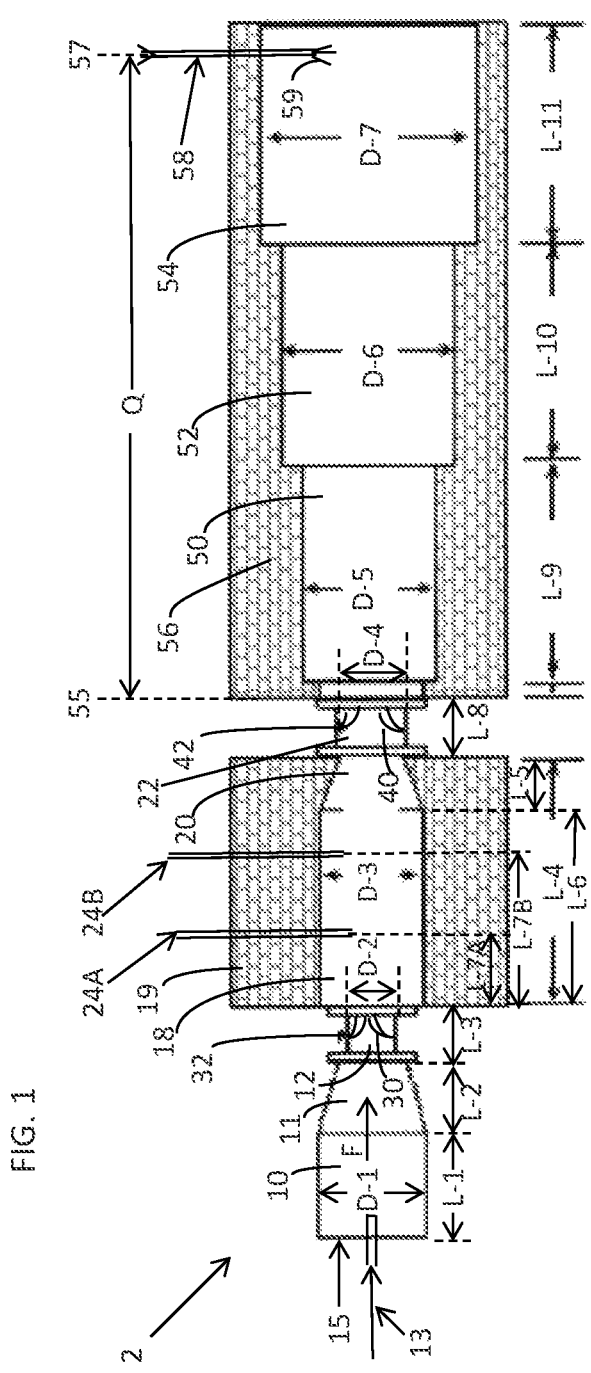
FIG. 1 is cross sectional view of a carbon black reactor that can be used to make carbon black according to an example of the present application.

The present invention relates to carbon blacks and rubber compositions containing the carbon blacks. The carbon blacks of the present invention can be reinforcing grade carbon blacks. The carbon blacks of the present invention, having analytical properties within the ranges specified, can impart improved reinforcing properties and low hysteresis to rubber compositions while maintaining stiffness and conductivity, to avoid or reduce adverse tradeoffs in overall properties. The hysteresis of the compounds means the difference between the energy applied to deform a rubber compound, and the energy released as the rubber compound recovers to its initial undeformed state. Tires, for example, with lower hysteresis values can have reduced rolling resistance and therefore can reduce the fuel consumption of the vehicle utilizing the tire. For tire parts, such as a carcass, adequate stiffness must be maintained for the physical structure and performance. The carbon black of the present invention can be used in non-tread tire components at lower loadings while maintaining stiffness relative to standard carbon blacks used in this application (e.g., N300, N500 or other "N" series carbon blacks which have been used in tire carcass or sidewall materials).

There are significant regulatory and environmental pressures for vehicles to improve their fuel economy. Tires play an important role in determining the fuel consumption of passenger cars, light trucks, and heavy truck vehicles. Compared to the tread, which provides wear and grip performance, the function of the rest of the carcass or other non-tread components is different, and thus the filler materials of choice tend to be different. The carbon blacks of the present invention can be used in tire components, such as the carcass or other non-tread parts, to replace the N300, N500 or other N series carbon blacks that have been used in such components. As indicated, the carbon blacks of the present invention can provide the ability to use carbon black to reduce hysteresis, but still maintain stiffness and conductivity, in the reinforced tire part or other rubber component. Unusually high structure carbon blacks can be provided in the present invention which can break (avoid or mitigate) the trade-off of loss of stiffness with improvement (reduction) in hysteresis. As shown by results from experimental studies disclosed in the examples herein, for rubber compound applications where tan δ (delta) max can be considered the metric for rolling resistance contribution, the carbon black of the present invention can provide stiffness and hysteresis in a rubber compound modified therewith in a ratio of Stiffness G' (10%) (MPa) to hysteresis tan $\delta_{max}$ that is at least about 5% greater, or at least about 10% greater, or at least about 15% greater, or at least about 20% greater, or at least 25% greater, or other greater amounts, than a similar composition of equivalent hardness containing commercial carbon blacks which have been comparatively tested, such as VULCAN® M carbon black, VULCAN® 6 carbon black or PROPEL® E6 carbon black, VULCAN® 10H carbon black, VULCAN® 7H carbon black, or others, such as N100, N200, or N300 series carbon blacks or other ASTM carbon blacks.

In view of these improved effects, the carbon blacks of the present invention can be advantageously used in rubber compounds. The rubber compounds that benefit from the carbon black of the present invention can include extruded, molded, or cast rubber products. The rubber products can be, e.g., tires, tire components, hoses, tubes, belts, seals, liners, or other rubber products. The tire components which can be reinforced with carbon black of the present invention include carcasses, sidewalls, bead encasing rubbers, belts, treads, or other tire parts. As an option, non-tread components, such as tire carcasses, sidewalls, bead encasing rubbers, or other tire parts, can be modified with the carbon black of the present invention.

Structure is a measure of the complexity of the carbon black aggregate particle. For purposes of the present invention, structure of carbon black is characterized by oil absorption and crushed oil absorption properties determined for the material. Structure characterized by oil absorption is determined as oil absorption number (OAN), as determined by ASTM D2414-13a, with OAN value expressed as milliliters of oil per 100 grams carbon black. The OAN value is also known as dibutylphthalate absorption number (DBP). Crushed OAN (COAN) measurements are used to determine a COAN value for the carbon black. The COAN value is the OAN value for the carbon black determined after controlled compression, expressed as milliliters of oil per 100 grams compressed carbon black. The COAN value is also known as crushed dibutylphthalate absorption number (CDBP, 24M4DBP). As used herein, except as otherwise noted, the COAN value is based upon ASTM Standard D3493-13a in modified form. For purposes herein, the procedure of ASTM test method D3493-13a is used for COAN measurements disclosed herein with the modifications that 15 g of carbon black is crushed in the compression cylinder described in the procedures of the test method, and 10 g out of these crushed 15 g is then tested in an absorptometer used to determine the oil absorption number according to procedures of the ASTM test method, after which the results are scaled to 100 g of material. The indicated OAN and COAN values determined according to the indicated ASTM standards also apply to the values as determined according to counterpart JIS standards thereto (e.g., JIS K 6221).

For purposes of this application, surface area of carbon black is defined and determined according to ASTM Standard D6556-10. As explained in ASTM Standard D6556-10, this test method covers the determination of the nitrogen surface area by the Brunauer, Emmett, and Teller (Brunauer, Stephen; Emmett, P. H.; Teller, Edward (1938). "Adsorption of Gases in Multimolecular Layers". *Journal of the American Chemical Society.* 60 (2): 309-319) theory of multilayer gas adsorption behavior using multipoint determinations and the external surface area based on the statistical thickness surface area method (STSA). The total surface measurement (NSA measurement) is based on the B.E.T. theory and it includes the total surface area, inclusive of micropores, pore diameters less than 2 nm (20 Å), whereas the external surface area, based on the statistical thickness surface area method (STSA), is defined as the specific surface area that is accessible to rubber.

As indicated, a carbon black of the present invention is characterized by a combination of properties defined by the external surface area (STSA) value, and OAN and COAN values determined for the same material.

One option of the present invention provides a carbon black having the following properties:
a) STSA ranging from 80 m$^2$/g to 150 m$^2$/g,
b) OAN≥180 mL/100 g, and
c) COAN≥110 mL/100 g.

Another option provides a carbon black having the following properties:
a) STSA ranging from 90 m$^2$/g to 150 m$^2$/g,
b) OAN≥180 mL/100 g, and c) COAN≥120 mL/100 g.

Another option provides a carbon black having the following properties:
said STSA ranging from 100 m$^2$/g to 150 m$^2$/g;
said OAN of at least 200 mL/100 g; and
said COAN of at least 120 mL/100 g.

As an option, the STSA, i.e., property a), can range from 80 m$^2$/g to 150 m$^2$/g, or ranges from 90 m$^2$/g to 150 m$^2$/g, or ranges from 100 m$^2$/g to 150 m$^2$/g, or ranges from 90 m$^2$/g to 145 m$^2$/g, or ranges from 95 m$^2$/g to 145 m$^2$/g, or ranges from 100 m$^2$/g to 145 m$^2$/g, or ranges from 90 m$^2$/g to 140 m$^2$/g, or ranges from 95 m$^2$/g to 140 m$^2$/g, or ranges from 100 m$^2$/g to 140 m$^2$/g, or ranges from 105 m$^2$/g to 135 m$^2$/g, or ranges from 110 m$^2$/g to 130 m$^2$/g, or ranges from 115 m$^2$/g to 125 m$^2$/g, or other values.

As an option, the OAN, i.e., property b), can be at least 180 mL/100 g, or at least 190 mL/100 g, at least 200 mL/100 g, or at least 210 mL/100 g, or at least 220 mL/100 g, or at least 230 mL/100 g, or ranges from 180 mL/100 g to 320 mL/g, or ranges from 190 mL/100 g to 320 mL/g, or ranges from 200 mL/100 g to 320 mL/g, or ranges from 210 mL/100 g to 320 mL/g, or ranges from 180 mL/100 g to 310 mL/g, or ranges from 190 mL/100 g to 310 mL/g, or ranges from 200 mL/100 g to 310 mL/100 g, or ranges from 210 mL/100 g to 310 mL/g, or ranges from 180 mL/100 g to 300 mL/g, or ranges from 190 mL/100 g to 300 mL/g, or ranges from 200 mL/100 g to 300 mL/g, or ranges from 210 mL/100 g to 300 mL/g, or ranges from 220 mL/100 g to 290 mL/100 g, or ranges from 230 mL/100 g to 280 mL/g, or other values.

As an option, the COAN, i.e., property c), can be at least 110 mL/100 g, or at least 120 mL/100 g, at least 130 mL/100 g, or at least 140 mL/100 g, or ranges from 110 mL/100 g to 160 mL/g, or ranges from 115 mL/100 g to 160 mL/g, or ranges from 120 mL/100 g to 160 mL/g, or ranges from 110 mL/100 g to 155 mL/g, or ranges from 115 mL/100 g to 155 mL/100 g, or ranges from 115 mL/100 g to 155 mL/g, or ranges from 110 mL/100 g to 150 mL/g, or ranges from 115 mL/100 g to 150 mL/g, or ranges from 120 mL/100 g to 150 mL/g, or ranges from 110 mL/100 g to 145 mL/g, or ranges from 115 mL/100 g to 145 mL/g, or ranges from 120 mL/100 g to 145 mL/g, or ranges from 125 mL/100 g to 145 mL/g, or ranges from 130 mL/100 g to 140 mL/g, or other values.

Carbon blacks of the present invention can have any of the indicated values for STSA, OAN, and COAN, i.e., properties a), b), and c), in any combination thereof.

With respect to other properties that the present carbon blacks can have in addition to the indicated properties for STSA, OAN, and COAN (i.e., properties a), b), and c)), these can include, but are not limited to, one or more of the following additional properties:

d) an iodine adsorption number (ASTM-D1510-13) which ranges from 85 mg/g to 220 mg/g, or ranges from 90 mg/g to 220 mg/g, or ranges from 100 mg/g to 220 mg/g, or ranges from 100 mg/g to 210 mg/g, or ranges from 85 mg/g to 210 mg/g, or ranges from 90 mg/g to 210 mg/g, or ranges from 100 mg/g to 210 mg/g, or ranges from 85 mg/g to 200 mg/g, or ranges from 90 mg/g to 200 mg/g, or ranges from 100 mg/g to 200 mg/g, or ranges from 110 mg/g to 200 mg/g, or ranges from 115 mg/g to 190 mg/g, or ranges from 120 mg/g to 180 mg/g, or other values;

e) an iodine adsorption number/STSA ratio ranging from 0.9 to 1.5, or ranges from 0.95 to 1.5, or ranges from 1 to 1.5, or ranges from 0.9 to 1.45, or ranges from 0.95 to 1.45, or ranges from 1 to 1.45, or ranges from 0.9 to 1.4, or ranges from 0.95 to 1.4, or ranges from 1 to 1.4, or ranges from 0.9 to 1.35, or ranges from 0.95 to 1.35, or ranges from 1 to 1.35, or ranges from 0.9 to 1.3, or ranges from 0.95 to 1.3, or ranges from 1.0 to 1.3, or ranges from 1.05 to 1.25, or ranges from 1.10 to 1.20, or other values. The iodine adsorption number/STSA ratio distinguishes unetched carbon black from etched carbon black, e.g., etched carbon black would have a greater iodine adsorption number/STSA ratio;

f) a BET surface area which ranges from 70 $m^2$/g to 200 $m^2$/g, or ranges from 90 $m^2$/g to 200 $m^2$/g, or ranges from 80 $m^2$/g to 170 $m^2$/g, or ranges from 70 $m^2$/g to 135 $m^2$/g, or ranges from 50 $m^2$/g to 140 $m^2$/g, or ranges from 105 $m^2$/g to 135 $m^2$/g, or ranges from 110 $m^2$/g to 130 $m^2$/g, or ranges from 115 $m^2$/g to 125 $m^2$/g, or other values;

g) a $\Delta D_{50}$ of 75 nm or less, or 70 nm or less, or 65 nm or less, or 60 nm or less, or 55 nm or less, or 50 nm or less, or ranges from 40 nm to 75 nm, or ranges from 45 nm to 70 nm, or ranges from 50 nm to 65 nm, or ranges from 55 nm to 60 nm, or other values;

h) a crystallite size ($L_a$) of 29 Å or less, or 27 Å or less, or 25 Å or less, or 23 Å or less, 21 Å or less, or 19 Å or less, or 15 Å or less, or 13 Å or less, or 11 Å or less, or 10 Å or less, or ranges from 10 Å to 29 Å, or ranges from 13 Å to 27 Å, or ranges from 15 Å to 25 Å, or ranges from 17 Å to 23 Å, or other values;

i) an average primary particle size of from about 8 nm to about 50 nm, or from about 12 nm to about 24 nm, or from about 13 nm to about 23 nm, or from about 14 nm to about 22 nm, or from about 15 nm to about 21 nm, or from about 16 nm to about 20 nm, or other values;

j) a surface energy which ranges from about 1 $mJ/m^2$ to about 15 $mJ/m^2$, or ranges from about 2 $mJ/m^2$ to about 13 $mJ/m^2$, about 3 $mJ/m^2$ to about 12 $mJ/m^2$, or ranges from about 4 $mJ/m^2$ to about 11 $mJ/m^2$, or ranges from about 5 $mJ/m^2$ to about 10 $mJ/m^2$, or other values;

k) a tint strength (ASTM-D3265-15a) which ranges from 105% to 140%, or ranges from 110% to 140%, or ranges from 115% to 135%, or ranges from 120% to 130%, or has other values.

The present carbon black can have, as an option, a combination of properties a), b), and c) with none, or one or more of the additional specified properties d)-k), in any combination. For instance, the carbon black of the present invention can have at least one, two, three, four, five, six, seven, or all eight of the properties d) to k) in addition to properties a), b), and c). The carbon black can have any combination of the properties a)-k). The $\Delta D50$ of property g) can be measured according to ISO 15825 method using Disc Centrifuge Photosedimentometry with a model BI-DCP manufactured by Brookhaven Instruments. The average primary particle size of property i) can be determined by ASTM-D3849-14a. Methods for determining property h), i.e., crystallite size $L_a$ (i.e., a size of ordered domains of microcrystalline carbon black as determined by Raman spectroscopy as disclosed in U.S. Pat. No. 9,287,565) and j), i.e., surface energy, which can be used, are disclosed in U.S. Pat. No. 9,287,565, which are incorporated in their entireties by reference herein. The other properties a) to f) and k) can be determined as indicated above or in the examples herein.

Rubber compounds of the present invention may be prepared from the carbon blacks by compounding with any elastomer including those useful for compounding a carbon black. Any suitable elastomer may be compounded with the carbon blacks to provide the elastomeric compounds of the present invention. Such elastomers include, but are not limited to, rubbers, polymers (e.g., homopolymers, copolymers, or terpolymers) of 1,3-butadiene, styrene, isoprene, isobutylene, 2,3-dimethyl-1,3-butadiene, acrylonitrile, ethylene, and propylene. Preferably, the elastomer has a glass transition temperature (Tg) as measured by differential scanning colorimetry (DSC) ranging from about −120° C. to about 0° C. Examples include, but are not limited, styrene-butadiene rubber (SBR), natural rubber, polybutadiene, polyisoprene, and their oil-extended derivatives. Blends of any of the foregoing elastomers may also be used as well as functional derivatives of these polymers.

As an option, among the rubbers suitable for use with the present invention are natural rubber and its derivatives such as chlorinated rubber. The carbon black of the present invention may be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1. Additional suitable elastomers will be readily apparent to those skilled in the art given the benefit of this disclosure.

As an option, the rubber compounds of the present invention can contain an elastomer (one kind or multiple kinds) and the carbon black of the present invention, as well as curing agents, a coupling agent, and, optionally, an additional different reinforcing filler from the carbon black of the present invention, various processing aids, oil extenders, antidegradents, and/or other additives. In making the rubber compositions, for example, one or more curing agents such as, for example, sulfur, sulfur donors, activators, accelerators, peroxides, and other systems used to effect vulcanization of the elastomer composition may be used. The loading level of the carbon black in the rubber compound can depend on the intended use of the composition. The amount of carbon black, as an option, can comprise from 1 wt % to 90 wt %, or from 5 wt % to 85 wt %, or from 10 wt % to 80 wt %, or from 20 wt % to 75 wt %, or from 25 wt % to 70 wt %, or from 30 wt % to 65 wt %, or from 35 wt % to 60 wt %, or other amounts, based on the total weight of the rubber compound.

The rubber compounds which incorporate the carbon black and other ingredients can be produced by any suitable method. The methods can include those using dry mixing techniques, wet mixing techniques, multi-stage mixing processes, or other methods for mixing and processing the ingredients, such as those disclosed in U.S. Pat. Nos. 5,916,956, 6,048,923, 7,582,688, 8,586,651, and 8,536,249, which are incorporated in their entireties by reference herein. As indicated, the resultant rubber compounds may be used for producing various elastomeric products, such as vehicle tire components (e.g. carcass, sidewall, bead rubber, tread), industrial rubber products, seals, timing belts, power transmission belting and the like, and other rubber goods.

As an option, the carbon blacks can be channel blacks, furnace blacks and lamp blacks. The carbon black is preferably a furnace carbon black. As a preferred option, the production of the carbon black involves the use of a multi-stage carbon black reactor. As used herein, a "multistage reactor" is outfitted with multiple feedstock injection locations, with one or more subsequent injection location(s) being positioned downstream from a first injection location. More preferably, the multistage reactor has at least two stages (two, three, four, or more stages) where generally there are at least two feedstock (e.g., two, three, four, or more feedstocks) introductions occurring.

Figure 2:
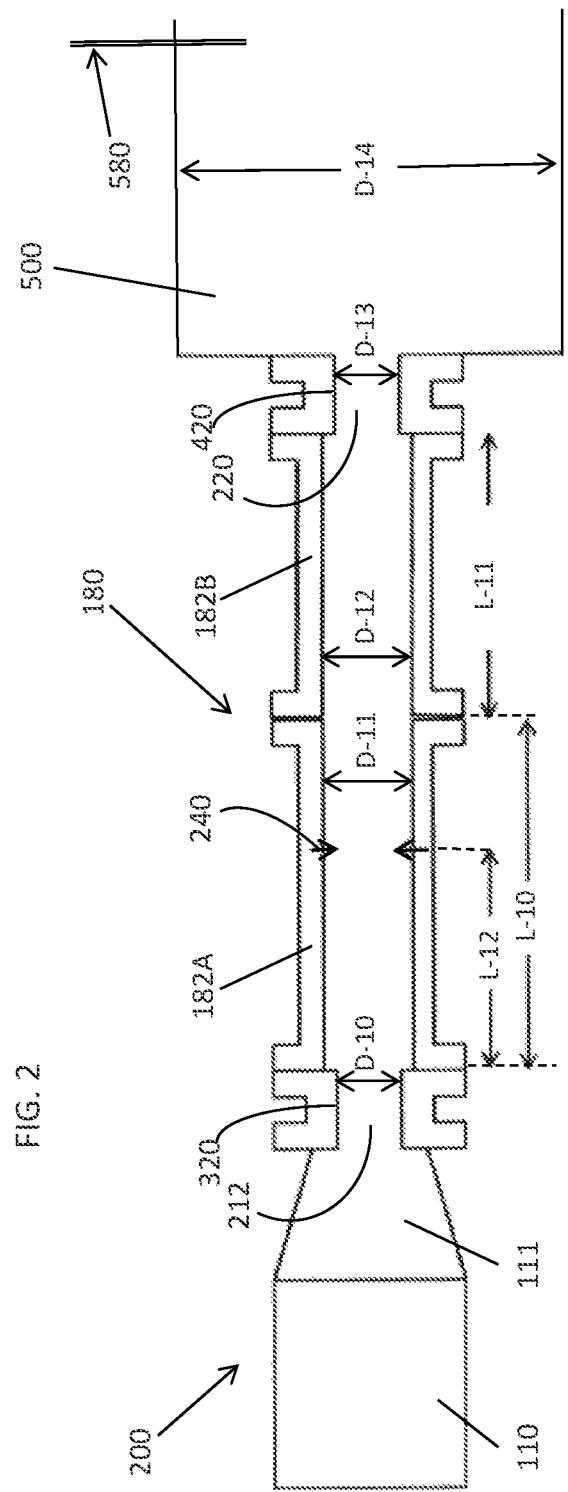
FIG. 2 is cross sectional view of another related carbon black reactor that can be used to make carbon black according to an example of the present application.

FIGS. 1 and 2 show illustrative portions of two types of related carbon black reactors that can be used to produce carbon blacks of the present invention using a multistage furnace process taking into account the process conditions described herein.

Process conditions and reactor arrangements for production of the present high structure carbon blacks in both reactors shown in FIGS. 1 and 2 can involve two transitions upstream of a complete quench in which carbon black yielding feedstock is introduced (i.e., injected) separated by a spacer tunnel of increased volumetric spacing, allowing for options of intermediate injection of quench water and/or use of a water-cooled metal spacer tunnel between the two transitions. The carbon black can be produced in these reactors wherein a carbon black yielding feedstock is introduced in the first transition (stage) and combined with a stream of hot gases to form a precursor, and after a residence time in the spacer tunnel, a second carbon black yielding feedstock is subsequently introduced downstream to the precursor at the second transition (stage), and thereafter the reaction stream is quenched to end the reaction.

For reactor 2 in FIG. 1, the transitions are identified as 12 and 22, the spacer tunnel as 18, and the complete quench location as 58. In the reactor 2 shown in FIG. 1, the spacer tunnel 18 is lined with liner 19, which can be refractory brick. Intermediate partial quench, e.g., by using intermediate quench fluid(s) such as water or other quench fluid (e.g., nitrogen), may be injected into spacer tunnel 18 via built-in injection port 24A, or 24B, or both, in reactor 2 shown in FIG. 1.

For reactor 200 in FIG. 2, the transitions are identified as 212 and 220, the spacer tunnel as 180, and the complete quench location as 580. In the reactor 200 shown in FIG. 2, the spacer tunnel 180 is formed of water-cooled metal pieces arranged in a tubular-shaped configuration. The spacer tunnel 180 can be, e.g., as a heat-conducting metallic-walled enclosure that is water-cooled, such as a metal tube structure with integral water jackets through which cooling water can be continually passed. Intermediate partial quench, e.g., by using intermediate quench fluid(s) such as water or other quench fluid, may be injected into spacer tunnel 180 via one or more injection ports 240 in the reactor 200 shown in FIG. 2. The injection ports 24A, 24B, or 240, as an option, can be water-jacketed pipes comprising a water-discharging passage and a separate passage for flow of cooling water within the water injection probes.

The enhanced volume provided by the spacer tunnel between the transitions (12 and 22 in FIG. 1, and 212 and 220 in FIG. 2) in these reactors (2, 200) allows for more recirculation, and longer residence time between planes defined by the two respective feedstock—injection locations at the indicated transitions of each reactor, both of which can enhance the ability of the carbon black to develop as much structure as possible during each stage. In addition, the second transition (22 in FIG. 1, 220 in FIG. 2) can be followed by a sharp expansion in the reactor diameter size (50 in FIG. 1, 500 in FIG. 2), which can also assist in maximizing the structure build in the carbon black. Without desiring to be bound to any particular theory, the two related reactor geometries shown in FIGS. 1 and 2 can be used to create a series of unusually high structure carbon blacks, such as characterized by OANs and COANs.

As to other features of reactor 2 shown in FIG. 1, reactor 2 includes a combustion chamber 10 in which a combustion gas (liquid or gaseous fuel) 13 is introduced, which is mixed with an oxidant 15 (comprising, e.g., oxygen, air), such as introduced through a port into chamber 10 (not shown), and ignited by any method known in the art. The resulting stream of hot gases F flows through a frustoconical zone 11 to converge the diameter to a generally cylindrical zone which comprises a number of tubular sections in series (12, 18, and 22). The carbon black yielding feedstock introduced in either transition (12, 22) can be introduced in any conventional way such as a single stream or plurality of streams. The introduction of the feedstocks can occur at any rate. With a plurality of streams, the rates for each stream can be the same or different. In FIG. 1, feedstock injection ports 32 and 42 are positioned within the front and the end tubular sections which define the first transition 12 and the second transition 22, respectively, where second transition 22 is positioned downstream of first transition 12. While FIG. 1 illustrates a single feedstock injection port (32, 42) per each transition (12, 22), typically, more than one feedstock injection port is arranged circumferentially per each transition 12 and 22 to inject multiple streams of feedstock 30 into first transition 12 and multiple streams of feedstock 40 into second transition 22. Any manner in which the carbon black yielding feedstocks can be introduced can be used. For instance, carbon black-yielding feedstock can be injected into a reactor at the transitions by a plurality of streams, which penetrate into the interior regions of the hot combustion gas stream at the transition 12, and the reaction stream at the second transition 22, to insure a high rate of mixing and shearing of the carbon black-yielding feedstock and combustion gas/reaction stream. As indicated, the spacer tunnel 18 is located between transitions 12 and 22.

In the configuration of FIG. 1, fuel is ignited at combustion chamber 10 and the resulting flow is directed to the tunnel-like zone comprised of zones 12, 18, and 22, where the fuel contacts a first injection of feedstock injection at first transition 12. Subsequent flow into spacer tunnel 18 allows for the indicated recirculation and longer residence time between the feedstock injection locations, before contact with a second charge of feedstock introduced at second transition 22. As shown in FIG. 1, spacer tunnel 18 can have a cylindrical portion of constant diameter at its front end adjoining the first transition 12 and a cone-shaped refractory piece at its rear end which contracts in diameter towards the second transition 22. As indicated, intermediate partial water quench or other quench fluid may be provided in spacer tunnel 18. The gas/carbon black particle mixture that exits transition 22 then flows into one or more reactor zones of increased diameter (50, 52, and 54), which may be lined with liner 56 (e.g., one or more reactor zones of increased diameter is refractory lined), and then is quenched. The quenching is typically performed by a water spray at a quench location 58, of which the distance from transition 22 can be varied. Quench 58, located at point 57, injecting quenching fluid 59, can be utilized to stop the reaction of the carbon black-yielding feedstock. Q is the distance from the downstream end 55 of transition 22, which can coincide with the beginning of reactor zone 50, to point 57, and will vary according to the position of the quench.

The manner of operation of reactor 200 shown in FIG. 2 can be generally similar to that of reactor 2 in FIG. 1 other than the indicated differences in the structure of the spacer tunnel located between the transitions. In the configuration of FIG. 2, fuel is ignited at combustion chamber 110 and the resulting flow is directed to the tunnel-like zone comprised of zones 212, 180, and 220, where the fuel contacts a first injection of feedstock injection 320 at first transition 212. Subsequent flow into spacer tunnel 180 allows for the indicated recirculation and longer residence time between the feedstock injection locations, before contact with a second charge of feedstock 420 introduced at second transition 220. As indicated, intermediate partial water quench or other quench fluid may be provided in spacer tunnel 180. The gas/carbon black particle mixture that exits transition 220 then flows into one or more reactor zones of increased diameter (500), and then is quenched at a quench location 580.

With regard to intermediate quench fluid introduced in spacer tunnel 18 of reactor 2 in FIG. 1 or spacer tunnel 180 in reactor 200 in FIG. 2, the weight ratio of the amount of injected fluid (e.g., quench water) to the carbon black-yielding feedstock introduced at the first transition (12, 120) can be relatively small compared to the feedstock rate. As an option, the weight ratio of the amount of injected fluid (e.g., quench water) to the carbon black-yielding feedstock introduced at the first transition (12, 120) can be from 0 to about 1:1, or from about 0.05:1 to about 1:1, or from about 0.1:1 to about 1:1, or from about 0.2:1 to about 0.5:1, or from about 0.3:1 to about 0.7:1, or from about 0.4:1 to about 0.8:1, or other amounts.

In FIGS. 1 and 2, the various D numbers represent various inner diameter sizes of portions of the reactor, and the various L numbers represent various lengths of portions of the reactor. As indicated, Q is the distance from the end of the second transition—to the final quench. Examples of these D, L, and Q parameters are illustrated in the examples section herein. Other values may be used. The term "diameter", as used herein with respect to any zone or stage of the carbon black reactor is hydraulic diameter ($D_H$), which is calculated from the formula: 4A/P where A is cross-sectional area and P is perimeter length.

With respect to the stream of hot gases that is combined with the carbon black yielding feedstock, the stream of hot gases can also be considered hot combustion gases that can be generated by contacting a solid, liquid, and/or gaseous fuel with a suitable oxidant stream such as, but not limited to, air, oxygen, mixtures of air and oxygen, or the like. Alternatively, a preheated oxidant stream may be passed through without adding a liquid or gaseous fuel. Examples of the fuel suitable for use in contacting the oxidant stream to generate the hot gases include any of the readily combustible gas, vapor, or liquid streams, such as natural gas, hydrogen, carbon monoxide, methane, acetylene, alcohol, or kerosene. Generally, it is preferred to use fuels having a high content of carbon-containing components and in particular, hydrocarbons. The ratio of air to fuel utilized to produce the carbon blacks of the present invention may be from about 0.6:1 to infinity, e.g., from 1:1 (stoichiometric ratio) to infinity, or from 0.6:1 to 10:1, or from 1:1 to 10:1. As stated, to facilitate the generation of hot gases, the oxidant stream may be preheated. Preferably, the stream of hot gases is formed upstream of any location where the carbon black yielding feedstock is introduced into the reactor.

The carbon black yielding feedstock can be any conventional carbon black yielding feedstock which results in the formation of carbon black. For instance, any hydrocarbon material can be used. A suitable feedstock can be any carbon black-yielding hydrocarbon feedstock which is readily volatilizable under the conditions of the reaction. For example, unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like may be used. Preferably, the introduction of the carbon black yielding feedstock at the second (downstream) transition does not completely quench the reactions. The carbon black yielding feedstock introduced at the second transition can be the same type of feedstock or a different feedstock from the carbon black yielding feedstock introduced in the first (upstream) transition. Further, the application of additional feedstock to the preexisting carbon black particles may be repeated any number of times until the reaction of feedstock to carbon black ceases. Each time additional feedstock is added, the temperature of the entire reaction mixture generally goes down, and carbon black particle size increases. In this way the additional introduction(s) of feedstock can act as a partial quenching agent for the cooling of the carbon black.

The total amount of carbon black yielding feedstocks introduced into the reactor (2, 200) can be split between the first transition (12, 120) and the second transition (22, 220) based on their feed rates (weight/time unit) of from about 15:85 to 85:15, or from about 20:80 to 80:20, or from 30:70 to 70:30, or from 60:40 to 40:60, respectively. As an option, the carbon black yielding feedstock introduced at the second transition contains at least 15% by weight of the total amount of the carbon black yielding feedstock utilized during the entire process. The carbon black yielding feedstock introduced at the second transition can contain from about 15% by weight to about 80% by weight of the total amount of the carbon black yielding feedstock utilized during the entire process. Other ranges include from about 25% to about 70% or from about 30% to about 60% by weight of the total amount by weight of the carbon black yielding feedstock utilized during the entire process.

As an option, the first and second transitions can have first and second respective temperature zones which have a temperature difference with respect to each other. In this option, the first temperature zone and the second temperature zone can have a temperature difference of 200° C. or more, and preferably a temperature difference of 300° C. or more. Suitable ranges with respect to the temperature difference can be, for instance, from about 200° C. to about 900° C. or from about 400° to about 700° C. Other temperature ranges with regard to the temperature difference can be used. Generally, with respect to this temperature difference, the first temperature zone has the higher temperature and the second temperature zone has the lower temperature thus creating the temperature difference though this is a preferred embodiment only. The difference in temperatures can be achieved any number of ways such as by the effect of indicated intermediate quench in the spacer tunnel, or avoiding any further introduction of combustion gases, or avoiding or minimizing formation of combustion gases in the second temperature zone, or any combinations of these. Other means to achieve this difference can be used. For instance, a water jacket can be used around the reactor (or parts thereof) where the carbon black yielding feedstock is introduced at the second transition or thereafter. In the alternative, or in combination, steam can be introduced at this point. In addition, or in the alternative, other quench agents, such as nitrogen, water, or other suitable quench agents, can be used to achieve a reduction in temperature at the point of where the second carbon black yielding feedstock is introduced or thereafter. Preferably, there is no water jacket or other quench devices or means in the first temperature zone in any of the embodiments of the present invention and preferably any such quenching occurs just prior, during, or right after introduction of the carbon black yielding feedstock at the second transition.

After the mixture of hot combustion gases and carbon black-yielding feedstock is completely quenched, the cooled gases can pass downstream into any conventional cooling and separating means whereby the carbon black is recovered. The separation of the carbon black from the gas stream can be readily accomplished by conventional means such as a precipitator, cyclone separator or bag filter. With respect to completely quenching the reactions to form the final carbon black, any conventional means to quench the reaction downstream of the introduction of the carbon black yielding feedstock at the second transition can be used and is known to those skilled in the art. For instance, a quenching fluid can be injected which may be water or other suitable fluids to stop the chemical reaction. The carbon black can be used as-is, or optionally can be pelletized or otherwise further processed or treated (e.g., surface-modified).

The carbon black production optionally may further include control of the introduction of at least one substance that is or that contains at least one Group IA or Group IIA element (or ion thereof) of the Periodic Table. The charge of metal ions can provide a repulsive force between individual carbon black particles. This repulsive force can keep particles from aggregating, thus decreasing the overall structure of the carbon black. In view of this, the presence of at least one Group IA or Group IIA element in the carbon black can be counterproductive to providing carbon black with very high structure. As an option, selected small amounts of at least one Group IA or Group IIA element may be tolerated or even introduced in a small amount at one or more phases of the reaction for providing some limited adjustment in the structure, provided that the resulting carbon product still meets the OAN and COAN requirements specified herein, e.g., the at least one Group IA or Group IIA element is present in an amount of about 10 ppm or less, e.g., about 5 ppm or less, about 2 ppm or less, about 1 ppm or less, about 0.5 ppm or less, about 0.2 ppm or less, or about 0.1 ppm or less. Preferably, the at least one Group IA or Group IIA element is present in an amount of about 0 ppm. The substance that is or contains at least one Group IA or Group IIA element can contain at least one alkali metal or alkaline earth metal, e.g., lithium, sodium, potassium, rubidium, cesium, francium, calcium, barium, strontium, or radium, or combinations thereof. The substance can be a solid, solution, dispersion, gas, salt, or any combinations thereof. If used, the substance can be introduced prior to the complete quenching. As indicated, the amount of the Group IA or Group IIA metal containing substance, if used or otherwise allowed to be present, can be any amount as long as a carbon black can be formed which still meets the indicated OAN and COAN values specified for structure.

The carbon black may be modified, as an option. For example, the carbon black of the present invention can include an attached chemical group and/or a coupling agent to the surface, or include a chemical group adsorbed thereon, or have a coating on the carbon black surface (e.g., chemical coating such as a silica coating or other coating), or have an oxidized surface, or any combination thereof. The carbon black of the present invention may have a chemical group or groups, such as an organic group or groups, attached. One process for attaching a chemical group to the carbon black can involve the reaction of at least one diazonium salt with the carbon black. Other methods of attachment of a chemical group to the carbon black may be used. The chemical groups, as well as methods to attach these groups to the carbon black, can include those shown in the following U.S. patents and publications, which are all incorporated in their entirety by reference herein: U.S. Pat. Nos. 5,851,280; 5,837,045; 5,803,959; 5,672,198; 5,571,311; 5,630,868; 5,707,432; 5,554,739; 5,689,016; 5,713,988; 8,975,316; 9,388,300; WO 96/18688; WO 97/47697; and WO 97/47699. The carbon black of the present invention may have a chemical group or groups, such as an organic group or groups, adsorbed thereon. The chemical groups, as well as methods to adsorb these groups to the carbon black, can include those shown in U.S. Pat. Nos. 8,975,316 and 9,175,150, which are incorporated in their entireties by reference herein.

Alternatively or in addition, a coupling agent may be used. The coupling agent can be or include one or more silane coupling agents, one or more zirconate coupling agents, one or more titanate coupling agents, one or more nitro coupling agents, or any combination thereof. The coupling agent can be or include bis(3-triethoxysilylpropyl) tetrasulfane (e.g., Si 69 from Evonik Industries, Struktol SCA98 from Struktol Company), bis(3-triethoxysilylpropyl) disulfane (e.g., Si 75 and Si 266 from Evonik Industries, Struktol SCA985 from Struktol Company), 3-thiocyanatopropyl-triethoxy silane (e.g., Si 264 from Evonik Industries), gamma-mercaptopropyl-trimethoxy silane (e.g., VP Si 163 from Evonik Industries, Struktol SCA989 from Struktol Company), gamma-mercaptopropyl-triethoxy silane (e.g., VP Si 263 from Evonik Industries), zirconium dineoalkanolatodi(3-mercapto) propionato-O, N,N'-bis(2-methyl-2-nitropropyl)-1,6-diaminohexane, S-(3-(triethoxysilyl)propyl) octanethioate (e.g., NXT coupling agent from Momentive, Friendly, W. Va.), and/or other silica coupling agents known to those of skill in the art.

Alternatively or in addition, the carbon black particles may be treated with other silica modifying or hydrophobizing agents. Such an agent may be covalently or non-covalently attached to the carbon black particles. Exemplary hydrophibizing agents include silicone fluids. Non-limiting examples of useful silicone fluids include polydimethylsiloxanes, polydiethylsiloxanes, phenylmethylsiloxane copolymers, fluoroalkylsiloxane copolymers, diphenyl siloxane-dimethylsiloxane copolymers, phenylmethylsiloxane-dimethylsiloxane copolymers, phenylmethylsiloxane-diphenylsiloxane copolymers, methylhydrosiloxane-dimethylsiloxane copolymers, polyalkylene oxide modified silicones, cyclic polysiloxanes of the D3, D4, and D5 types, and the like. Modified silicone fluids, such as hydroxyl-terminated siloxanes, may be used as well.

Alternatively or in addition, the silica modifying agent can comprise a hydrophobizing silane. For example, the hydrophobizing silane can be a compound of the formula: $R^3_{4-n}SiX_n$ wherein n is 1-3, each $R^3$ is independently selected from the group consisting of hydrogen, a $C_1$-$C_{18}$ alkyl group, a $C_3$-$C_{18}$ haloalkyl group, and a $C_6$-$C_{14}$ aromatic group, and each X is independently a $C_1$-$C_{18}$ alkoxy group or halo. Alternatively, or in addition, the silica modifying agent comprises a silazane. For example, the hydrophobizing agent can be hexamethyldisilazane, octamethyltrisilazane, a cyclic silazane, and the like. In certain embodiments, the silica modifying agent comprises a charge modifying agent such as one or more of those disclosed in U.S. Patent Application Publication 2010/0009280, the contents of which are incorporated herein by reference. Alternatively, or in addition, the dimethylsiloxane co-polymers disclosed in U.S. Patent Application Publication 2011/0244382 A1, the contents of which are incorporated herein by reference, may be used to treat the carbon black particles.

The carbon black of the present invention may be modified by depositing silicon-containing species, such as silica, on at least a portion of the surface of the carbon black to coat the carbon black. The carbon black may be silica-coated. Silica coating materials, as well as methods to coat the carbon black with silica, can include those shown in U.S. Pat. Nos. 6,197,274 and 6,541,113, which are incorporated in their entireties by reference herein. The silica coating may partially or completely cover the surfaces of the carbon black.

The carbon black may be oxidized. Suitable oxidizing agents may include, but are not limited to, acid (e.g., nitric acid) and ozone. Coupling agents may be used with the oxidized carbon blacks, such as coupling agents shown in U.S. Pat. No. 6,057,387, which is incorporated in its entirety by reference herein, or others such as indicated herein.

The present invention will be further clarified by the following examples, which are intended to be purely exemplary of the present invention.

EXAMPLES

Example 1

Carbon black of the present invention was produced in reactor runs utilizing a multi-stage reactor configuration as illustrated in FIG. 1 or FIG. 2. The reactor dimensions and components are outlined in Table 1 below.

In each run, the primary fuel for the combustion reaction was natural gas introduced into the reactor at about ambient temperature (approximately 77° F.), a primary combustion of 120% was used, the introduced $K^+$ or other Group IA/IIA element metal ion concentration was zero (0 ppm), and a total carbon black yielding feedstock rate of about 433 to 282 kg/hr was used. The liquid feedstock was preheated to 175° C. before introduction into the reactor. The feedstock introduction orifices were arranged in an equidistantly spaced-apart ring pattern (axial plane) around the periphery of the reactor in the locations 32 and 42 in FIG. 1, and locations 320 and 420 in FIG. 2. The feedstock utilized had properties as described in Table 2 below.

TABLE 1

Reactors Geometry/Components

| Reactor (FIG. 1) Dimension/Component | Value | Reactor (FIG. 2) Dimension/Component | Value |
|---|---|---|---|
| D-1 (inch) |  | D-10 (inch) | 4.5 |
| D-2 (inch) | 4.5 | D-11 (inch) | 6.3 |
| D-3 (inch) | 13.5 | D-12 (inch) | 6.3 |
| D-4 (inch) | 5.3 | D-13 (inch) | 5.3 |
| D-5 (inch) | 18 | D-14 (inch) | 18 |
| D-6 (inch) | 27 | L-10 (inch) | 24 |
| D-7 (inch) | 36 | L-11 (inch) | 18 |
| L-1 (inch) |  | L-12 (inch) | 18 |
| L-2 (inch) |  | 320 | 6 tips, 0.019 to 0.026 in. orifice tip size |
| L-3 (inch) |  | 420 | 4 tips, 0.019 to 0.026 in. orifice tip size |
| L-4 (inch) | 59 | 240 | 4 injection points |
| L-5 (inch) | 17 |  |  |
| L-6 (inch) | 56 |  |  |
| L-7A (inch) | 21 |  |  |
| L-7B (inch) | 59 |  |  |
| L-8 (inch) |  |  |  |
| L-9 (feet) | 21 |  |  |
| L-10 (feet) | 5.3 |  |  |
| L-11 (feet) | 5.3 |  |  |
| Q (feet) |  |  |  |
| 32 | 6 tips, 0.019 to 0.026 in. orifice tip size |  |  |
| 42 | 4 tips, 0.019 to 0.026 in. orifice tip size |  |  |

TABLE 2

Feedstock Properties

| Hydrogen/Carbon Ratio | 1.07 |
|---|---|
| Hydrogen (wt %) | 8.09 |
| Carbon (wt %) | 90.55 |
| Sulfur (wt %) | 0.77 |
| Nitrogen (wt %) | 0.23 |
| Oxygen (wt %) | — |
| Wtd Specific Gravity | 1.0615 |

The intermediate quench water, if used, was introduced as a fine spray by means of a pressurized atomizer. For the reactor of FIG. 1, intermediate quench water, if used, was introduced at only one of the two indicated locations 24A or 24B. The carbon black formed in the reaction was then completely quenched with water downstream of the second carbon black yielding feedstock to form the carbon black of the present invention.

Additional process conditions, including overall combustion (OAC), the feedstock split between the first and second feedstock introductions respectively, are shown in Table 3.

TABLE 3

CB Process Parameters

| Run/CB product | Reactor | OAC % | FS Oil Split (FS at 1st) % | AIR (LPA) Rate nm³/hr | Intermediate Water Quench kg/h |
|---|---|---|---|---|---|
| 1 | FIG. 2 | 31 | 55% | 1500 | 65 |
| 2 | FIG. 2 | 31 | 65% | 1500 | 0 |
| 3 | FIG. 2 | 31 | 65% | 1500 | 65 |
| 4 | FIG. 2 | 37 | 65% | 1500 | 65 |
| 5 | FIG. 1 | 31 | 58% | 1500 | 0 |
| 6 | FIG. 1 | 31 | 58% | 1500 | 65 |
| 7 | FIG. 1 | 34 | 66% | 1500 | 0 |
| 8 | FIG. 1 | 34 | 66% | 1500 | 65 |
| 9 | FIG. 1 | 34 | 66% | 1500 | 0 |
| 10 | FIG. 1 | 36 | 71% | 1500 | 65 |
| 11 | FIG. 1 | 36 | 71% | 1500 | 0 |

Particle size distributions measurements were determined according to ISO 15825 method using Disc Centrifuge Photosedimentometry with a model BI-DCP manufactured by Brookhaven Instruments. Volume weighted aggregate size distribution (ASD) plots were generated for each of the selected samples of carbon black. Table 4 provides the mean diameter ($D_{mean}$), mode diameter ($D_{mode}$), $D_{10}$, $D_{50}$, $D_{90}$, $\Delta D_{50}$, $D_{75}/D_{25}$, $\Delta D_{50}/D_{mode}$, $(D_{90}-D_{10})/D_{50}$ of the particle size distribution, and Equation (1) values, for Runs 1-6 and 8-10. The Equation (1) value is calculated as: $133.33 \times (\Delta D_{50}/D_{mode})/\text{COAN}$. Values calculated from Equation (1) for several commercial carbon blacks are also included in Table 4. The commercial carbon blacks are sold under the tradenames VULCAN® M ("VM"), VULCAN® 6 ("V6"), PROPEL® E6 ("PE6"), and VULCAN® 10H ("V10H") (Cabot Corporation).

TABLE 4

Particle size and distributions

| Run/Product | $D_{10}$ (nm) | $D_{50}$ (nm) | $D_{90}$ (nm) | $D_{mode}$ (nm) | $D_{mean}$ (nm) | $\Delta D_{50}$ (nm) | $D_{75}/D_{25}$ | $\Delta D_{50}/D_{mode}$ | $(D_{90}-D_{10})/D_{50}$ | Eq. (1) |
|---|---|---|---|---|---|---|---|---|---|---|
| VM | | 85 | 130 | 77 | 91 | 61 | 1.56 | 0.79 | | 1.053307 |
| V6 | | 81 | 114 | 79 | 83 | 59 | 1.5 | 0.75 | | 1.010076 |
| PE6 | | 91 | 139 | 85 | 94 | 85 | 1.68 | 1 | | 1.201171 |
| V10H | | 68 | 99 | 64 | 71 | 50 | 1.53 | 0.78 | | 1.029677 |
| 1 | 70 | 106 | 176 | 90 | 116 | 68 | 1.62 | 0.76 | 1.00 | 0.791647 |
| 2 | 63 | 91 | 137 | 84 | 97 | 55 | 1.49 | 0.65 | 0.81 | 0.661561 |
| 3 | 62 | 91 | 134 | 84 | 95 | 54 | 1.47 | 0.64 | 0.79 | 0.656394 |
| 4 | 53 | 79 | 122 | 69 | 84 | 51 | 1.54 | 0.74 | 0.87 | 0.731613 |
| 5 | 66 | 101 | 180 | 84 | 113 | 64 | 1.70 | 0.76 | 1.13 | 0.723791 |
| 6 | 64 | 96 | 156 | 83 | 104 | 61 | 1.59 | 0.73 | 0.96 | 0.737355 |
| 8 | 53 | 80 | 124 | 71 | 85 | 52 | 1.54 | 0.73 | 0.89 | 0.684784 |
| 9 | 51 | 77 | 119 | 69 | 82 | 51 | 1.55 | 0.74 | 0.88 | 0.699917 |
| 10 | 49 | 73 | 109 | 66 | 77 | 48 | 1.51 | 0.73 | 0.82 | 0.677146 |

Physical properties of the carbon black of runs 1-11 are shown in Table 5 with those of the indicated commercial carbon black sold under the tradenames VULCAN® M ("VM"), VULCAN® 6 ("V6"), PROPEL® E6 ("PE6"), and VULCAN® 10H ("V10H") (Cabot Corporation). The carbon blacks formed in each corresponding run has an iodine adsorption number, OAN, COAN, STSA, BET, and tint shown in Table 5. OAN, COAN, STSA, and BET were determined by respective methods indicated hereinabove, and iodine adsorption number was determined by the ASTM D1510 method, and tint was determined by the ASTM D3265 method. In Table 5, nm³ refers to normal cubic meters, where "normal" is defined as the volume of the gas corrected to 0° C. and 1 atm of pressure.

TABLE 5

Properties of Selected CB Products and Comparisons

| Run/Product | BET (m²/g) | STSA (m²/g) | $I_2$ (mg/g) | I2/STSA (mg/m²) | OAN (ml/100 g) | COAN (ml/100 g) | Tint (% ITRB) |
|---|---|---|---|---|---|---|---|
| VM | | 87 | 90 | 1.03 | 120 | 100 | 112 |
| V6 | | 104 | 121 | 1.16 | 114 | 99 | 115 |
| PE6 | | 95 | 96 | 1.01 | N/A | 111 | 108 |
| V10H | 144 | 135 | 142 | 105 | N/A | 101 | N/A |
| 1 | 98 | 98 | 87 | 0.88 | 281 | 128 | 107 |
| 2 | 117 | 107 | 114 | 1.07 | 242 | 131 | 117 |
| 3 | 103 | 102 | 98 | 0.96 | 259 | 130 | 115 |
| 4 | 127.4 | 125.8 | 132.2 | 1.05 | 240.5 | 134.7 | 122.6 |
| 5 | 106 | 104 | 115 | 1.10 | 236 | 140 | 119 |
| 6 | 101 | 100 | 106 | 1.05 | 301 | 132 | 117 |
| 7 | 147.6 | 127 | 162 | 1.28 | 242.2 | 142.2 | 124.5 |
| 8 | 133.7 | 122.6 | 146 | 1.19 | 229.4 | 142.6 | 125.7 |
| 9 | 138.8 | 126.7 | 152.3 | 1.20 | 242.1 | 140.8 | 128.1 |
| 10 | 179.3 | 140.4 | 194.7 | 1.39 | 221.1 | 143.2 | 131.9 |
| 11 | 191.7 | 146.4 | 216.4 | 1.48 | 221.9 | 144.5 | 129.8 |

Example 2

Rubber compositions incorporating one of the selected carbon blacks (runs/products 1-11) of Example 1 and commercial carbon black (VM, V6, PE6, V10H) referenced in Table 5 were prepared. Modulus (300%), stiffness (G' 10%), and loss hysteresis (maximum tan δ or tan delta) were determined for each modified rubber. In these experiments, the carbon black was used in a rubber formulation which had a complete formulation as shown in Table 6 below to study the effects of using the carbon blacks of the present invention in comparison to the commercial carbon black mentioned above as well as those commercially available from Cabot Corporation under the tradenames VULCAN® 7 ("V7"), CRX™ 1444 ("CRX1444"), and CRX™ 1346 ("CRX1346"). The formulation includes N-(1,3-dimethyl-butyl)-N'-phenyl-/phenylenediamine, Flexsys, St. Louis, Mo. ("6PPD), CAUGHT RPO process oil, Antioxidant DQ ("AO DQ") pellets, Akrochem, Akron, Ohio, Akrowax™ 5031 beads, Akrochem, Akron, Ohio. In the final pass, sulfur and the accelerator N-tert-butyl benzothiazole-2-sulfenamide ("TBBS") were added.

TABLE 6

Rubber Formulation

| Ingredients | Amount (phr) |
|---|---|
| natural rubber (SMR 20) | 100 |
| carbon black | 50/45 or 55/50 |
| CALIGHT RPO process oil | 2.5 |
| AO DQ pellets | 1.5 |
| 6PPD | 1.5 |
| zinc oxide | 5 |
| stearic acid | 3 |
| wax beads | 1.5 |
| Final Pass | |
| Sulfur | 1.2 |
| TBBS (accelerator) | 1.4 |

The components used in the rubber compositions (as set forth in Table 6) were mixed following a three-stage mixing in a BR Banbury 1600 mixer outlined in Table 7 below.

TABLE 7

Mixing Conditions

| | Time (s) | Operation |
|---|---|---|
| Stage 1 | | Farrel BR Banbury mixer (1600 cc), 70% fill factor, 80 rpm, 50° C. |
| | 0 | Add polymer |
| | 30 | Add ⅔ carbon black |
| | 90 | Add ⅓ carbon black |
| | 120 | Sweep |
| | 180 | Add zinc oxide, stearic acid, 6PPD, AO DQ pellets, wax beads and process oil (collectively, "smalls") |
| | 240 | Scrape/Sweep |
| | 300 | Dump - mix for 5 min., adjust rpm not to exceed 150° C. |
| | | Pass through open mill 6 times (50° C.) |
| Stage 2 | | Farrel BR Banbury mixer (1600 cc), 70% fill factor, 80 rpm, 50° C. |
| | 0 | Add Stage 1 compound |
| | 240 | Dump - do not exceed 150° C., dump earlier if compound reaches 150° C. |
| | | Pass through open mill 6 times (50° C.) |
| Stage 3 | | Farrel BR Banbury mixer (1600 cc), 70% fill factor, 60 rpm, 50° C. |
| | 0 | Add Stage 2 compound |
| | 30 | Add sulfur and TBBS |
| | 60 | Sweep |
| | 120 | Dump |
| | | Pass through open mill 6 times (50° C.) |

Vulcanization was carried out in a heated press set at 150° C. for a time determined by a conventional rubber rheometer (i.e., T90+10% of T90, where T90 is the time to achieve 90% vulcanization).

The following tests were used to obtain the performance data on each of the modified rubbers:

300% modulus (MPa) was determined by ASTM D 412-06 Standard Test Methods for

Carbon Black in SBR-Recipe and Evaluation Procedures;

tan δ was measured with a Rheometrics Dynamic Spectrometer Model ARES-2K at a constant frequency of 10 Hz, a constant temperature, and in shear mode of strain. Strain sweeps were run at 0° C. from 0.1% to 120% double strain amplitude. Measurements were taken at ten points per decade and the maximum measured tan δ was reported.

Storage modulus G' was determined and reported as part of these measurements of tan δ. G' is often associated with the stiffness of a material.

The performance data obtained from these tests is shown in Tables 8-11 at various carbon black loadings. The differing loadings for the commercial, comparative blacks were greater than that of the claimed carbon blacks to match the hardness.

TABLE 8

Performance Data

| Product | CB (phr) | 300% mod. (MPa) | G' 10% (MPa) | Max tan δ | G'/ tan δ (max) | Hardness RT | Hardness 60° C. |
|---|---|---|---|---|---|---|---|
| VM | 50 | 14.9 | 1.84 | 0.193 | 9.5 | 65.2 | 59.3 |
| V6 | 50 | 12.4 | 1.92 | 0.228 | 8.4 | 66.1 | 60.0 |
| PE6 | 50 | 16.1 | 1.74 | 0.199 | 8.8 | 66.4 | 61.0 |
| V10H | 50 | 13.3 | 1.93 | 0.227 | 8.5 | 67.0 | 60.7 |
| 1 | 45 | 17.0 | 1.96 | 0.175 | 11.2 | 67.8 | 62.7 |
| 2 | 45 | 15.0 | 2.03 | 0.196 | 10.4 | 68.7 | 62.7 |
| 3 | 45 | 17.1 | 2.09 | 0.193 | 10.8 | 68.4 | 62.4 |
| 5 | 45 | 17.6 | 2.18 | 0.190 | 11.5 | 68.0 | 63.0 |
| 6 | 45 | 17.4 | 2.08 | 0.191 | 10.9 | 68.6 | 63.4 |

TABLE 9

Performance Data

| Product | CB (phr) | 300% mod. (MPa) | G' 10% (MPa) | Max tan δ | G'/ tan δ (max) | Hardness RT | Hardness 60° C. |
|---|---|---|---|---|---|---|---|
| V7H | 50 | 14.28 | 2.18 | 0.20 | 10.73 | 65.8 | 59.3 |
| V10H | 50 | 15.03 | 1.82 | 0.18 | 9.85 | 67.0 | 60.2 |
| CRX1444 | 50 | 16.67 | 2.19 | 0.25 | 8.81 | 70.4 | 64.3 |
| CRX1346 | 50 | 14.02 | 2.08 | 0.23 | 9.19 | 67.9 | 60.8 |
| 4 | 45 | 17.65 | 2.13 | 0.19 | 11.43 | 70.7 | 64.7 |
| 7 | 45 | 17.63 | 2.45 | 0.21 | 11.87 | 70.1 | 64.2 |
| 8 | 45 | 18.66 | 2.25 | 0.21 | 10.63 | 69.8 | 64.0 |
| 9 | 45 | 17.77 | 2.47 | 0.19 | 13.08 | 69.4 | 63.7 |
| 10 | 45 | 17.58 | 2.48 | 0.22 | 11.51 | 71.8 | 65.5 |
| 11 | 45 | 17 | 2.51 | 0.23 | 11.14 | 71.4 | 65.1 |

TABLE 10

Performance Data

| Product | CB (phr) | 300% mod. (MPa) | G' 10% (MPa) | Max tan δ | G'/ tan δ (max) | Hardness RT | Hardness 60° C. |
|---|---|---|---|---|---|---|---|
| VM | 55 | 15.90 | 2.07 | 0.23 | 9.0 | 66.8 | 61.1 |
| V6 | 55 | 14.36 | 2.51 | 0.25 | 9.9 | 68.6 | 62.9 |
| PE6 | 55 | 18.92 | 2.48 | 0.21 | 11.9 | 69.7 | 64.2 |
| V10H | 55 | 15.88 | 2.30 | 0.25 | 9.4 | 69.0 | 63.2 |
| 1 | 50 | 19.89 | 2.60 | 0.17 | 15.11 | 70.2 | 65.0 |
| 2 | 50 | 18.22 | 2.54 | 0.23 | 11.08 | 70.5 | 64.6 |
| 3 | 50 | 19.62 | 2.35 | 0.22 | 10.49 | 69.8 | 64.7 |
| 5 | 50 | 20.00 | 2.79 | 0.21 | 13.27 | 71.8 | 65.9 |
| 6 | 50 | 19.41 | 2.68 | 0.20 | 13.42 | 71.3 | 66.4 |

TABLE 11

Performance Data

| Product | CB (phr) | 300% mod. (MPa) | G' 10% (MPa) | Max tan δ | G'/ tan δ (max) | Hardness RT | Hardness 60° C. |
|---|---|---|---|---|---|---|---|
| V7H | 55 | 15.81 | 2.02 | 0.26 | 7.70 | 68.925 | 62.33 |
| V10H | 55 | 15.63 | 2.46 | 0.24 | 10.36 | 69.675 | 63.23 |

TABLE 11-continued

Performance Data

| Product | CB (phr) | 300% mod. (MPa) | G' 10% (MPa) | Max tan δ | G'/ tan δ (max) | Hardness RT | Hardness 60° C. |
|---|---|---|---|---|---|---|---|
| CRX1444 | 55 | 19.15 | 2.84 | 0.24 | 11.72 | 73.225 | 67.08 |
| CRX1346 | 55 | 16.45 | 2.52 | 0.26 | 9.60 | 72.5 | 65.53 |
| 4 | 50 | 20.03 | 2.45 | 0.23 | 10.81 | 72.9 | 67.2 |
| 7 | 50 | 20.41 | 2.74 | 0.23 | 11.91 | 73.7 | 68.2 |
| 8 | 50 | 19.92 | 2.58 | 0.23 | 11.44 | 74.4 | 68.3 |
| 9 | 50 | 21.98 | 2.58 | 0.23 | 11.43 | 74.0 | 69.1 |
| 10 | 50 | 20.23 | 2.79 | 0.24 | 11.51 | 74.3 | 68.2 |
| 11 | 50 | 20.38 | 2.78 | 0.24 | 11.81 | 74.0 | 68.2 |

As specifically shown by the results in Table 8-11, the inventive carbon blacks provided stiffness and hysteresis in rubber compounds modified therewith in a ratio of Stiffness G' (10%) (MPa) to hysteresis tan $\delta_{max}$ that is at least about 5% or even at least about 10% greater than the rubber compounds that contained an equivalent amount of VM, PE6, or V6.

As also shown by the data of Tables 8-11, the rubber products modified with carbon blacks of the present invention had lower tan δ max and higher stiffness values from rubber products modified with the commercial carbon black.

In general, the present invention can further include the following one or more aspects. Overall, high COAN and low $\Delta D_{50}$ can increase G' at given STSA, but at the same time, the low $\Delta D_{50}$ may negatively affect tan δ. From these results, high COAN, in combination with the STSA and OAN properties, can yield carbon blacks that break the G' and tan δ trade-off (e.g., avoiding detrimental loss of stiffness with provision of reduced hysteresis).

Another aspect of the carbon blacks of the present invention is the low narrow aggregate size distribution (ASD), as expressed by $\Delta D_{50}/D_{mode}$, over the recited COAN values of at least 110 mL/100 g, i.e., the width of the ASD distribution for such high structure carbon black. This ASD is narrow for such high structure carbon blacks, and, without desiring to be bound to theory, may contribute to the breaking of the stiffness and hysteresis trade-off seen in the studied rubber compositions of the present invention.

In one aspect, the narrow ASD over COAN is indicated by the Equation (1): $133.33*(\Delta D_{50}/D_{mode})/COAN<1$. This equation represents an ability to measure the amount of variation in aggregate size distribution. A number of less than 1 represents a more controlled or low variation in aggregate size distribution, whereas a value equal to or greater than 1 represents a greater variation in aggregate size distribution that is representative of previous commercially available carbon blacks with a high COAN. In other words, with at least some carbon blacks having a high COAN, this would lead to an increase in undesired variation in aggregate size distribution. In the past, it was difficult to achieve a narrow aggregate size distribution along with the other properties of the carbon black described herein. The present invention is able to overcome this difficulty, and the values of less than 1 from Equation (1) for carbon blacks of the present invention are representative of this ability. COAN can be increased without increasing the variation in size of aggregates. The carbon blacks of the present invention can have values from Equation (1) of from less than 1, or less than 0.99, or less than 0.9, or less than 0.8, or from 0.4 to 0.99, or from a 0.45 to 0.85, or from 0.5 to 0.825, or form 0.6 to 0.8, or other values.

The present invention includes the following aspects/embodiments/features in any order and/or in any combination:

1. A carbon black having the following properties:
   an STSA ranging from 80 m²/g to 150 m²/g;
   an OAN of at least 180 mL/100 g; and
   a COAN of at least 110 mL/100 g.
2. The carbon black of any preceding or following embodiment/feature/aspect, having the following properties:
   said STSA ranging from 90 m²/g to 150 m²/g;
   said OAN of at least 180 mL/100 g; and
   said COAN of at least 120 mL/100 g.
3. The carbon black of any preceding or following embodiment/feature/aspect, having the following properties:
   said STSA ranging from 100 m²/g to 150 m²/g;
   said OAN of at least 200 mL/100 g; and
   said COAN of at least 120 mL/100 g.
4. The carbon black of any preceding or following embodiment/feature/aspect, wherein the carbon black has a ratio of iodine adsorption number/STSA ranging from 0.9 to 1.5.
5. The carbon black of any preceding or following embodiment/feature/aspect, wherein the ratio of iodine adsorption number/STSA ranges from 1 to 1.3.
6. The carbon black of any preceding or following embodiment/feature/aspect, wherein the iodine adsorption number ranges from 90 mg/g to 220 mg/g.
7. The carbon black of any preceding or following embodiment/feature/aspect, wherein the OAN is at least 200 mL/100 g.
8. The carbon black of any preceding or following embodiment/feature/aspect, wherein the OAN is at least 220 mL/100 g.
9. The carbon black of any preceding or following embodiment/feature/aspect, wherein the OAN ranges from 200 mL/100 g to 310 mL/100 g.
10. The carbon black of any preceding or following embodiment/feature/aspect, wherein the COAN is at least 130 mL/100 g.
11. The carbon back of any preceding or following embodiment/feature/aspect, wherein the COAN ranges from 120 mL/100 g to 150 mL/100 g.
12. The carbon black of any preceding or following embodiment/feature/aspect, wherein the carbon black has a BET surface area ranging from 70 m²/g to 200 m²/g.
13. The carbon black of any preceding or following embodiment/feature/aspect, wherein the carbon black has a BET surface area ranging from 90 m²/g to 200 m²/g.
14. The carbon black of any preceding or following embodiment/feature/aspect, wherein the carbon black has a BET surface area ranging from 70 m²/g to 130 m²/g.
15. The carbon black of any preceding or following embodiment/feature/aspect, wherein the carbon black has a $\Delta D_{50}$ of 75 nm or less.
16. The carbon black of claim 1, wherein the carbon black further comprises the property $133.33*(\Delta D_{50}/D_{mode})/COAN<1$.
17. The carbon black of any preceding or following embodiment/feature/aspect, wherein the carbon black has a $L_a$ crystallite size of 29 Å or less.
18. The carbon black of any preceding or following embodiment/feature/aspect, wherein the carbon black has a primary particle size of 24 nm or less.
19. The carbon black of any preceding or following embodiment/feature/aspect, wherein the carbon black has a primary particle size of from about 12 nm to 24 nm.

20. The carbon black of any preceding or following embodiment/feature/aspect, wherein the carbon black has a surface energy ranging from about 1 mJ/m² to about 15 mJ/m².

21. The carbon black of any preceding or following embodiment/feature/aspect, wherein the carbon black has a tint strength ranging from 110% to 140%.

22. A modified carbon black comprising the carbon black of any preceding or following embodiment/feature/aspect modified by at least one of: at least one coupling agent attached to a surface thereof, at least one chemical group attached to a surface thereof, at least one chemical group adsorbed on a surface thereof, a surface coating, a surface oxidation, or any combination thereof.

23. The modified carbon black of any preceding or following embodiment/feature/aspect wherein the at least one chemical group is at least one organic group.

24. A rubber compound comprising at least one polymer and the carbon black of any preceding or following embodiment/feature/aspect.

25. A vulcanized rubber compound comprising at least one polymer and the carbon black of any preceding or following embodiment/feature/aspect.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A carbon black having the following properties:
   an STSA ranging from 80 m²/g to 150 m²/g;
   an OAN of at least 180 mL/100 g;
   a COAN of at least 110 mL/100 g, wherein the carbon black has a primary particle size of 24 nm or less.

2. The carbon black of claim 1, having the following properties:
   said STSA ranging from 90 m²/g to 150 m²/g;
   said OAN of at least 180 mL/100 g;
   said COAN of at least 120 mL/100 g.

3. The carbon black of claim 1, having the following properties:
   said STSA ranging from 100 m²/g to 150 m²/g;
   said OAN of at least 200 mL/100 g;
   said COAN of at least 120 mL/100 g.

4. The carbon black of claim 1, wherein the carbon black has a ratio of iodine adsorption number/STSA ranging from 0.9 to 1.5.

5. The carbon black of claim 4, wherein the ratio of iodine adsorption number/STSA ranges from 1 to 1.3.

6. The carbon black of claim 4, wherein the iodine adsorption number ranges from 90 mg/g to 220 mg/g.

7. The carbon black of claim 1, wherein the OAN is at least 200 mL/100 g.

8. The carbon black of claim 1, wherein the OAN is at least 220 mL/100 g.

9. The carbon black of claim 1, wherein the OAN ranges from 200 mL/100 g to 310 mL/100 g.

10. The carbon black of claim 1, wherein the COAN is at least 130 mL/100 g.

11. The carbon back of claim 1, wherein the COAN ranges from 120 mL/100 g to 150 mL/100 g.

12. The carbon black of claim 1, wherein the carbon black has a BET surface area ranging from 70 m²/g to 200 m²/g.

13. The carbon black of claim 1, wherein the carbon black has a BET surface area ranging from 90 m²/g to 200 m²/g.

14. The carbon black of claim 1, wherein the carbon black has a BET surface area ranging from 70 m²/g to 130 m²/g.

15. The carbon black of claim 1, wherein the carbon black has a $\Delta D_{50}$ of 75 nm or less.

16. The carbon black of claim 1, wherein the carbon black further comprises the property $133.33*(\Delta D_{50}/D_{mode})/COAN<1$.

17. The carbon black of claim 1, wherein the carbon black has a $L_a$ crystallite size of 29 Å or less.

18. The carbon black of claim 1, wherein the carbon black has an average primary particle size of from about 12 nm to 24 nm.

19. The carbon black of claim 1, wherein the carbon black has a surface energy ranging from about 1 mJ/m² to about 15 mJ/m².

20. The carbon black of claim 1, wherein the carbon black has a tint strength ranging from 110% to 140%.

21. A modified carbon black comprising the carbon black of claim 1 modified by at least one of: at least one coupling agent chemically attached to a surface thereof, at least one chemical group chemically attached to a surface thereof, at least one chemical group adsorbed on a surface thereof, a surface coating, a surface oxidation, or any combination thereof.

22. The modified carbon black of claim 21, wherein the at least one chemical group is at least one organic group.

23. A rubber compound comprising at least one polymer and the carbon black of claim 1.

24. A vulcanized rubber compound comprising at least one polymer and the carbon black of claim 1.

25. The carbon back of claim 1, wherein the COAN ranges from 140 mL/100 g to 160 mL/100 g.

26. The carbon back of claim 1, wherein the COAN is at least 140 mL/100 g.

27. A carbon black having the following properties:
   an STSA ranging from 80 m²/g to 150 m²/g;
   an OAN of at least 180 mL/100 g;
   a COAN of at least 110 mL/100 g, wherein the carbon black has an average primary particle size of from about 12 nm to 24 nm.

28. The carbon black of claim 27, wherein the carbon black has a ratio of iodine adsorption number/STSA ranging from 0.9 to 1.5.

29. The carbon black of claim 27, wherein the carbon black has a BET surface area ranging from 70 m²/g to 200 m²/g.

30. The carbon black of claim 27, wherein the carbon black has a $\Delta D_{50}$ of 75 nm or less.

31. The carbon black of claim 27, wherein the carbon black further comprises the property $133.33*(\Delta D_{50}/D_{mode})/COAN<1$.

32. The carbon black of claim 27, wherein the carbon black has a surface energy ranging from about 1 mJ/m$^2$ to about 15 mJ/m$^2$.

33. The carbon black of claim 27, wherein the carbon black has a tint strength ranging from 110% to 140%.

34. A modified carbon black comprising the carbon black of claim 27 modified by at least one of: at least one coupling agent chemically attached to a surface thereof, at least one chemical group chemically attached to a surface thereof, at least one chemical group adsorbed on a surface thereof, a surface coating, a surface oxidation, or any combination thereof.

35. A rubber compound comprising at least one polymer and the carbon black of claim 27.

36. A vulcanized rubber compound comprising at least one polymer and the carbon black of claim 27.

37. A carbon black having the following properties:
  an STSA ranging from 80 m$^2$/g to 150 m$^2$/g;
  an OAN of at least 180 mL/100 g;
  a COAN of at least 110 mL/100 g, wherein the carbon black has a surface energy ranging from about 1 mJ/m$^2$ to about 15 mJ/m$^2$.

* * * * *